(12) United States Patent
Chourreau et al.

(10) Patent No.: US 9,862,476 B2
(45) Date of Patent: Jan. 9, 2018

(54) AIRCRAFT EQUIPPED WITH A DEVICE FOR ACCESSING A COMPARTMENT FROM THE GROUND

(71) Applicant: Airbus Operations (SAS), Toulouse (FR)

(72) Inventors: Yannick Chourreau, Montberon (FR); Patrick Salgues, Toulouse (FR); Richard Brethes, Grenade (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 77 days.

(21) Appl. No.: 14/710,743

(22) Filed: May 13, 2015

(65) Prior Publication Data

US 2015/0329196 A1    Nov. 19, 2015

(30) Foreign Application Priority Data

May 14, 2014    (FR) .................................... 14 54272

(51) Int. Cl.
| | | |
|---|---|---|
| *B64C 1/24* | (2006.01) | |
| *B64C 1/14* | (2006.01) | |
| *E06C 5/24* | (2006.01) | |

(52) U.S. Cl.
CPC ................ *B64C 1/24* (2013.01); *B64C 1/14* (2013.01); *E06C 5/24* (2013.01)

(58) Field of Classification Search
CPC .... B64C 1/24; B64D 9/00; B60R 3/00; B60R 3/02; B60R 3/007; E06C 5/24; E06C 5/32; E06C 5/00; E06C 5/02
USPC ........................ 182/77–81, 36–39; 244/129.6
See application file for complete search history.

(56) References Cited

U.S. PATENT DOCUMENTS

| | | | | |
|---|---|---|---|---|
| 2,196,546 A | * | 4/1940 | Bowers | B64C 1/1407 182/77 |
| 2,294,000 A | | 8/1942 | Reisner et al. | |
| 2,327,680 A | * | 8/1943 | Tavaris | A61G 3/061 296/19 |
| 2,446,434 A | * | 8/1948 | Rechain | B64C 1/24 182/207 |
| 2,455,157 A | * | 11/1948 | Bigelow | B64C 1/32 182/77 |
| 2,558,975 A | | 7/1951 | Moreno et al. | |
| 2,647,677 A | * | 8/1953 | Reed | B64C 1/24 105/449 |
| 2,933,149 A | * | 4/1960 | Lee | B64C 1/24 14/71.5 |
| 2,990,148 A | * | 6/1961 | James | B64C 1/24 182/127 |
| 3,213,962 A | * | 10/1965 | Clark, Jr. | B64C 1/1407 182/78 |

(Continued)

FOREIGN PATENT DOCUMENTS

GB            604929            7/1948

OTHER PUBLICATIONS

French Search Report, dated Jan. 7, 2015.

*Primary Examiner* — Daniel Cahn
(74) *Attorney, Agent, or Firm* — Greer, Burns & Crain, Ltd.

(57) ABSTRACT

An aircraft comprising an opening for accessing a compartment and a ladder. The aircraft comprises at least one support. The ladder comprises at least one fastener element connected to a support by a removable connection comprising a pivot axis.

4 Claims, 3 Drawing Sheets

(56) References Cited

U.S. PATENT DOCUMENTS

| | | | | |
|---|---|---|---|---|
| 3,403,749 | A * | 10/1968 | Warren | B64C 1/24 182/106 |
| 4,021,071 | A * | 5/1977 | Norman | B60R 3/02 182/84 |
| 4,039,163 | A * | 8/1977 | Shorey | B64C 1/22 14/71.5 |
| 4,186,901 | A * | 2/1980 | Shorey | B64C 1/22 14/71.3 |
| 4,235,399 | A * | 11/1980 | Shorey | B64C 1/22 14/71.1 |
| 4,453,684 | A * | 6/1984 | Hanks | B64C 1/24 105/430 |
| 4,770,373 | A * | 9/1988 | Salo | B64D 1/22 182/198 |
| 5,143,324 | A * | 9/1992 | Cornelius | B64C 1/24 182/88 |
| 5,395,075 | A * | 3/1995 | Sprenger | B64D 11/00 182/77 |
| 5,535,964 | A * | 7/1996 | Ahlsten | B64D 9/00 244/118.5 |
| 6,854,147 | B1 * | 2/2005 | Ahlsten | B64D 9/00 14/69.5 |
| 6,986,485 | B2 * | 1/2006 | Farnsworth | B64D 11/003 182/77 |
| 7,073,629 | B2 * | 7/2006 | Gardner | E06C 7/44 182/108 |
| 7,080,713 | B1 * | 7/2006 | Riggs | B60R 3/02 182/127 |
| 8,322,490 | B1 * | 12/2012 | Loemker | E06C 5/24 114/362 |
| 8,413,280 | B2 * | 4/2013 | Goin | B60P 1/431 14/71.1 |
| 2008/0128555 | A1 * | 6/2008 | Dotte | B64C 1/1407 244/131 |
| 2008/0156933 | A1 * | 7/2008 | Saint-Jalmes | B64D 11/00 244/118.5 |
| 2014/0306062 | A1 * | 10/2014 | Olive | B64C 1/24 244/129.6 |
| 2015/0129719 | A1 * | 5/2015 | Troise | B64C 1/24 244/129.6 |
| 2016/0024844 | A1 * | 1/2016 | Neubauer | E06C 1/38 182/106 |
| 2016/0214701 | A1 * | 7/2016 | Probst | B64C 1/1415 |

* cited by examiner

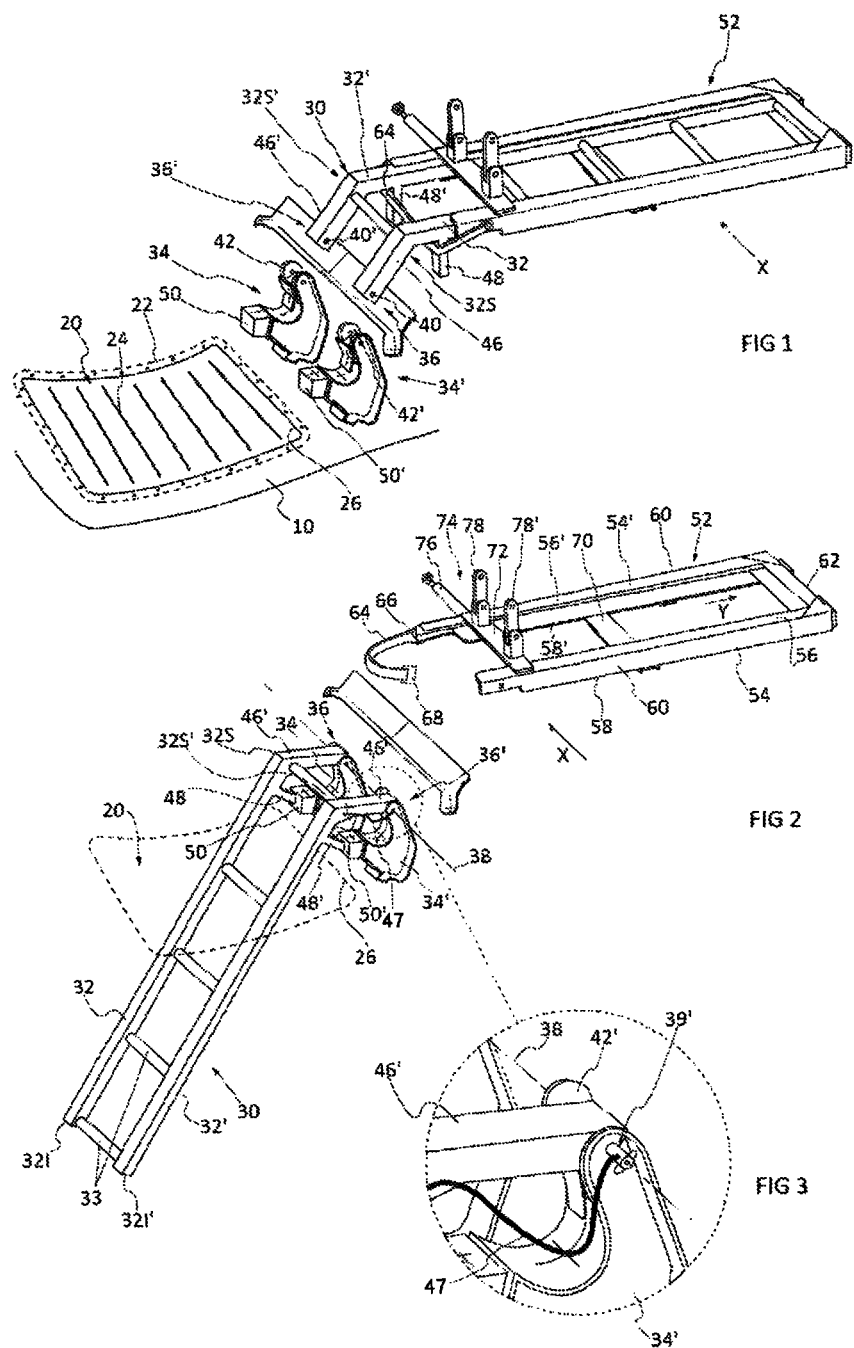

AIRCRAFT EQUIPPED WITH A DEVICE FOR ACCESSING A COMPARTMENT FROM THE GROUND

CROSS-REFERENCES TO RELATED APPLICATIONS

This application claims the benefit of the French patent application No. 1454272 filed on May 14, 2014, the entire disclosures of which are incorporated herein by way of reference.

BACKGROUND OF THE INVENTION

The present invention relates to an aircraft equipped with a device for accessing a compartment from the ground.

In order to perform maintenance operations, pieces of equipment installed in certain compartments of an aircraft are accessible from the ground, via an opening provided in the fuselage of the aircraft, using a rigid ladder.

During use, the lower ends of the sides of the ladder rest on the ground, whereas the upper portions of the sides bear against an edge of the opening.

Due to the fact that the mass of the aircraft varies, inter alia, depending on the load thereof, the distance separating the edge of the opening and the ground varies between a maximum height and a minimum height. Consequently, in order to access the equipment under any circumstance, the ladder must have a length greater than the maximum distance so that the ladder rests on the ground and bears against the edge of the opening.

Even if this is not always necessary, the ladder must have a length greater than the maximum distance separating the edge of the opening and the ground. The longer the ladder is, the greater is the mass thereof, which is counteractive to the objectives of an aircraft designer, who will tend to reduce the mass on board the aircraft.

In the case of a loaded aircraft, the portion of the ladder inside the fuselage is too long and makes it difficult to access the equipment.

In accordance with another aspect, the use of the ladder is not completely secured insofar as the ladder could slide, the upper portions of the sides of the ladder being simply placed against the edge of the opening. It is not possible to attach the ladder to the aircraft due to the fact that the height of the edge varies, unless providing a telescopic ladder, which tends to significantly increase the mass of the ladder.

SUMMARY OF THE INVENTION

The present invention also aims to overcome the disadvantages of the prior art.

To this end the invention relates to an aircraft comprising a ladder, characterized in that the aircraft comprises at least one support, and in that the ladder comprises at least one fastener connected to the support by a removable connection comprising a pivot axis.

This design makes it possible to reduce the length of the ladder and consequently to reduce the mass thereof. In addition, the ladder is not simply rested against the edge of the opening, but is connected to the aircraft, which helps to make the use of said ladder more secure.

The ladder preferably comprises two sides, and for each side a fastener element positioned at the upper end of the side.

This design makes it possible to reduce the length of the ladder and therefore the mass thereof. In addition, the portion of the ladder inside the fuselage is reduced to the greatest possible extent, which makes it possible to prevent the access from being obstructed by the ladder.

In accordance with one embodiment, each side comprises a through-hole, each support comprises a clevis with two through-openings, and each removable connection comprises a pin. Each pin preferably comprises a ball-lock system actuatable by a button.

In accordance with another feature, each side comprises an extension inclined relative to the rest of the side, the fastener element being positioned at the free end of the extension. In addition, the ladder preferably comprises at least one spacer, each support comprising a bearing surface against which the spacer bears.

In accordance with another feature, the aircraft comprises a storage slide, in which the ladder is stored when not being used. In accordance with one embodiment the storage slide comprises:

two side rails with a C-shaped cross section arranged opposite one another, each designed to receive one side of the ladder, at least one end cross-member connecting the two side rails, a strap, which comprises a first end connected to a first side rail and a second end equipped with a detachable connection that cooperates with the second side rail.

Further features and advantages will become clear from the following description of the invention, which is given solely by way of example, with reference to the accompanying drawings.

BRIEF DESCRIPTION OF THE DRAWINGS

FIG. 1 is a perspective view of a ladder stored in a storage slide illustrating the invention, FIG. 2 is a perspective view of the ladder of FIG. 1 removed from the storage slide and connected to supports, illustrating the invention, FIG. 3 is a perspective view illustrating in detail the connection zone between the ladder and a support.

DETAILED DESCRIPTION OF THE PREFERRED EMBODIMENTS

Figure 5A:
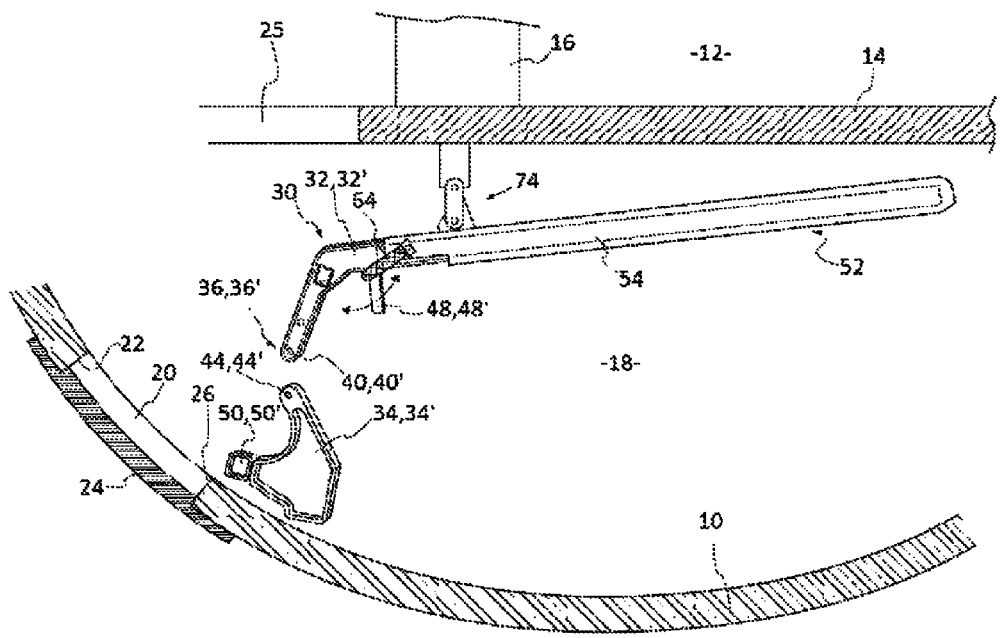
FIG. 5A is a side view illustrating a ladder stored in a storage slide.
Figure 5B:
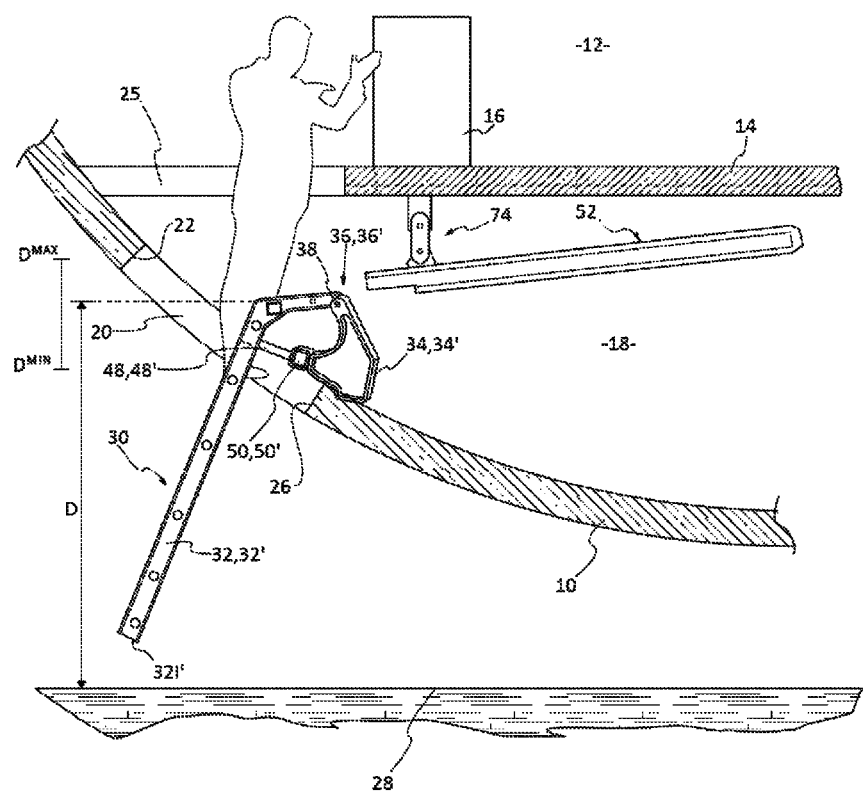
FIG. 5B is a side view of a ladder fixed on its supports with an operator.

FIGS. 5A and 5B show a portion of a fuselage 10 of an airplane, a compartment 12 inside the fuselage 10, a portion of the floor 14 of the compartment 12 and also at least one piece of equipment 16 placed in the compartment 12 above the floor 14.

As is known, the fuselage 10 comprises a skin connected on a structure.

By way of example, the compartment 12 is an avionics compartment (referred to as an E&E bay) and the piece of equipment 16 may be a piece of electrical or electronic equipment of the aircraft.

In accordance with one design, taking into account the approximately circular cross-sectional form of the fuselage 10, a space 18 is available below the floor 14.

As illustrated in FIGS. 1, 5A and 5B, the fuselage 10 comprises an opening 20 delimited by a contour 22 and sealed by a removable panel 24 so as to release the opening 20 when access to the compartment 12 is sought.

In accordance with one layout, the opening 20 leads into the space 18 and the floor 14 comprises a passage 25 in the extension of the opening 20 for access to the equipment 16 by passing through the opening 20.

In accordance with a simplified variant, the opening 20 leads directly into the compartment 12.

In accordance with one embodiment the contour 22 describes a square or rectangular shape with rounded corners. It comprises at least one rectilinear edge 26, which extends in a longitudinal direction denoted X.

This edge 26 is the portion of the periphery closest to the ground 28 (visible in FIG. 5B).

In order to access the equipment 16 via the opening 20, the aircraft comprises a rigid ladder 30, which comprises two sides 32, 32' connected by bars 33.

Each side 32, 32' comprises a lower end 32I, 32I' corresponding to the lower end of the ladder and an upper end 32S, 32S' corresponding to the upper end of the ladder 30.

The aircraft comprises two supports 34, 34'—one for each side 32, 32'13 attached to the fuselage 10 and more particularly to the structure of the aircraft. The supports 34, 34' are attached to the structure, in the proximity of the edge 26, by any suitable means (bolting, riveting, etc.).

These supports 34, 34' are offset in relation to one another in the longitudinal direction X and are spaced at a distance approximately equal to the spacing of the sides 32, 32'.

For each support 34, 34' the ladder comprises one fastener element 36, 36' designed to cooperate with the corresponding support 34, 34'.

In accordance with another variant, the ladder 30 comprises at least one fastener element 36 and the aircraft comprises at least one support 34.

When the ladder 30 is suspended at the supports 34, 34' by its sides 32, 32', it does not touch the ground. The lower ends 32I, 32I' of the sides are preferably relatively close to a surface of the aircraft or are in contact with said surface. By way of example, the surface of the aircraft making it possible to access the ladder is the upper portion of a nacelle.

This design makes it possible to reduce the length of the ladder 30 and consequently to reduce the mass thereof. In addition, the sides 32, 32' are no longer simply bearing against the edge, but are connected to the aircraft by the supports 34, 34', which contributes to making the use of the ladder 30 more secure. In accordance with another aspect, since the ladder is never in contact with the ground, the length of said ladder is independent of the height D of the opening relative to the ground, this height varying between the values Dmin and Dmax depending on the mass on board the aircraft.

In accordance with another feature, for each side 32, 32', the fastener element 36, 36' is positioned at the upper end 32S, 32S' of the side. This design makes it possible to reduce the length of the ladder 30 and therefore the mass thereof. In accordance with another point the portion of the ladder inside the fuselage is reduced to the greatest possible extent, which makes it possible to prevent the access to the equipment 16 from being obstructed by the ladder.

In accordance with another feature, each fastener element 36, 36' is connected to its support 34, 34' by a removable connection comprising a pivot axis 38 arranged between the fastener element 36, 36' and the corresponding support 34, 34'. This pivot axis 38 is oriented in the longitudinal direction X and allows a rotation of the ladder 30 relative to the supports 34, 34'. This design allows a more secure fastening between the ladder and the aircraft.

In accordance with one embodiment each side 32, 32' comprises a through-hole 40, 40' and each support 34, 34' comprises a clevis 42, 42' with two through-openings 44, 44'. Each removable connection comprises a pin 39, 39' of which the diameter is substantially equal, apart from play, to that of the through-holes 40, 40' and of the through-openings 44, 44'. The pins 39, 39' have axes coincident with the pivot axis 38.

This design makes it possible to obtain a removable connection of simple design and use.

Each pin 39, 39' is preferably connected to a side by a flexible link 47, such as a chain 47, for example.

In accordance with one embodiment each pin 39, 39' is a pin with a ball-lock system actuatable by a button of the "ball lock button pin" type. This lock system prevents the removal of the pins without the action on a button.

Figure 4:
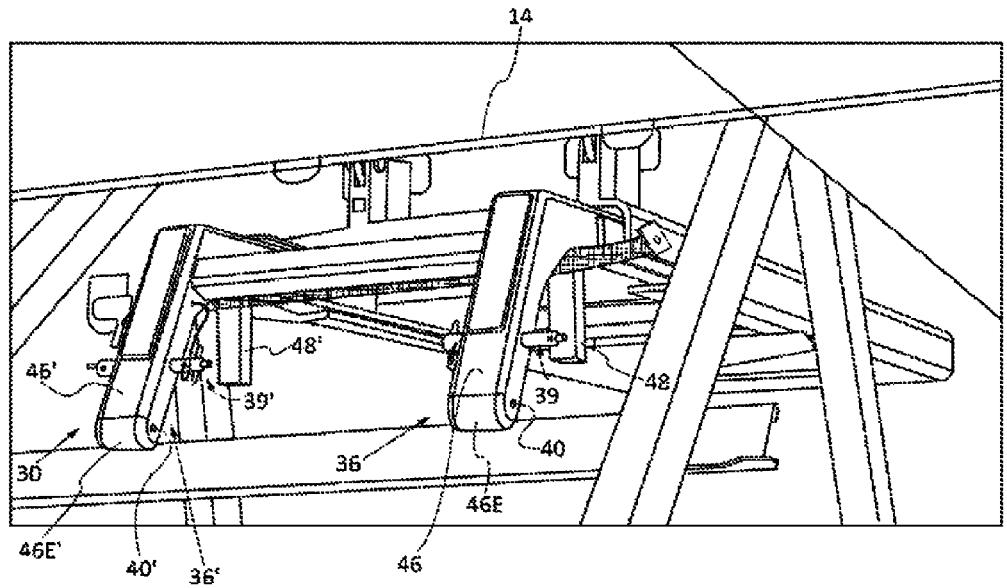
FIG. 4 is a perspective view illustrating a ladder stored in a storage slide fixed below a floor.

In accordance with another feature, each side 32, 32' comprises at the upper end 32S, 32S' thereof an extension 46, 46' inclined relative to the rest of the side supporting the bars 33. In accordance with this design the fastener element 36, 36', for each side, is positioned at the free end 46E, 46E' (visible in FIG. 4) of each extension 46, 46'.

The length and inclination of the extension 46, 46' are determined so that the supports 34, 34' are offset in relation to the edge 26 and do not interfere with the opening 20. This design makes it possible to limit the bulk of the ladder 30 and of the supports 34, 34' at the opening 20.

In order to give an approximation of size, each extension 46, 46' forms an angle $\theta$ of approximately 120° relative to the rest of the side and has a length of approximately from 10 to 20 cm.

In order to prevent the ladder 30 from bearing against the edge 26, at least one side 32, 32' and preferably each side 32, 32', comprises a spacer 48, 48'. In accordance with one embodiment, each spacer 48, 48' is present in the form of a profile of which a first end is fixed to the side.

In accordance with one embodiment, the spacer 48, 48', for each side, is a hollow tube that extends perpendicularly to the side 32, 32' in a plane containing the side 32, 32' and extension 46, 46' thereof.

Each support 34, 34' advantageously comprises a bearing surface 50, 50', against which the spacer 48, 48', more particularly the free end thereof, bears. For each support 34, 34', the bearing surface 50, 50' is offset in relation to the removable connection 36, 36' so as to limit the rotation of the ladder 30 relative to the support 34, 34'.

In accordance with one embodiment, each support is C-shaped, a first branch of the C comprising, at the end thereof, the clevis 42, 42', a second branch of the C comprising, at the end thereof, the bearing surface 50, 50'.

In order to optimize the mass thereof, the different portions of the ladder, i.e., the sides 32, 32', the bars 33, the extensions 46, 46' and the spacers 48, 48', are hollow profiles made of aluminum alloy.

The aircraft advantageously comprises a storage slide 52, in which the ladder 30 is stored when not being used.

As illustrated in FIG. 2, the storage slide 52 comprises two side rails 54, 54' with a C-shaped cross section, arranged opposite one another, each being designed to receive a side 32, 32' of the ladder and to guide these in a storage direction Y when the ladder is introduced or removed.

Each side rail 54, 54' comprises an upper wing 56, 56', a lower wing 58, 58' and a lateral wall 60, 60' connecting the two upper and lower wings.

For each side rail the upper and lower wings are spaced at a distance making it possible to slide one of the sides 32, 32' with relatively little play. The lateral walls 60, 60' are spaced such that the two sides 32, 32' spaced by the bars 33 slide between the lateral walls 60, 60' with relatively little play.

The storage slide 52 comprises at least one end cross-member 62 connecting the two side rails 54, 54', said cross-member being provided to limit the movement of the ladder 30 in the storage direction Y.

In accordance with one embodiment, the end cross-member 62 has a C-shaped cross section and connects the ends of the two side rails 54, 54'.

The storage slide 52 preferably comprises a strap 64 to immobilize the ladder 30 in the storage slide. In accordance with one embodiment, the strap 64 comprises a first end 66 connected to a first side rail 54' and a second end 68 equipped with a detachable connection to the second side rail 54. By way of example, the detachable connection comprises a loop attached to the second end 68 of the strap 64, which cooperates with a hook attached to the second side rail 54. Other means could be used to immobilize the ladder 30 in the storage slide 52.

The storage slide 52 also comprises, in addition to the end cross-member 62, other cross-members connecting the two side rails 54, 54'. In accordance with one embodiment, the storage slide comprises a lower cross-member 70 connecting the lower wings 58, 58' of the side rails 54, 54' and an upper cross-member 72 connecting the upper wings 56, 56' of the side rails 54, 54'.

The storage slide 52 is preferably arranged below the floor 14 and connected thereto by any suitable means. However, the invention is not limited to this setup. The storage slide 52 could also be connected to other parts of the aircraft.

Whatever the setup, the storage slide 52 is positioned correctly in relation to the opening 20 such that the ladder 30 is accessible from the ground, can be removed from the storage slide 52, and is taken out from the aircraft via the opening 20.

In accordance with one embodiment, the storage slide 52 is connected to the floor 14 by a connection 74 which comprises a connecting link 76 and two legs 78, 78', which connect the upper cross-member 72 to the floor. Of course, the invention is not limited to this embodiment for the connection 74 between the storage slide and the aircraft.

The use of the ladder is relatively simple.

When the ladder is not used it is stored in the storage slide 52. The strap 64 is connected to the second side rail 54 and immobilizes the ladder in the storage slide 52, as illustrated in FIG. 5A.

In order to access the equipment 16 an operator removes the removable panel 24.

To take the ladder 30 out from the storage slide 52, the operator detaches the strap 64 from the second side rail 54 and pulls the ladder 30 outside the storage slide.

After having taken the ladder 30 out from the storage slide 52 and from the aircraft via the opening 20, the operator brings the ends of the extensions 46, 46' into alignment with the devises 42, 42' and inserts the pins 39, 39' into the through-holes 40, 40' and the through-openings 44, 44'. Due to the weight of the ladder, the spacers 48, 48' come naturally into contact with the bearing surfaces 50, 50'. The operator can then climb the ladder as illustrated in FIG. 5B in order to access the equipment 16.

When the operator wishes to store the ladder 30 he removes the pins 39, 39' by pressing for each of said pins on an unlocking button. After having disconnected the ladder from the supports 34, 34', he inserts said ladder into the storage slide 52, then attaches the strap 64 to the second side rail 54. The operator can then reposition the removable panel 24 in order to close the opening 20.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   an opening configured to access a compartment;
   at least two supports;
   a ladder comprising at least two vertical stiles connected by rungs therebetween, wherein a first end of each of the stiles respectively has a fastener element removably connected to each of the two supports by a removable connection comprising a pivot axis, wherein the ladder is rigid and non-hinged with respect to itself, the ladder comprises two sides, the ladder has a major length along the two sides that spans from a lower end of the ladder to an upper end of the ladder which comprises the first ends of the stiles;
   a storage slide configured to receive the ladder when the ladder is in a storage position, wherein said storage slide is not directly attached to the two supports, wherein the ladder is configured to move between the storage position and an access position, wherein the fastener elements of the ladder are directly attached to the two supports when in the access position, wherein the ladder is detached and separated from the two supports when being moved from the access position to the storage position, and wherein the ladder is received within the storage slide when in the storage position;
   wherein said ladder comprises at least one spacer which is separate from the fastener elements, and wherein at least one of said two supports comprises a bearing surface against which said at least one spacer bears when the ladder is in the access position;
   wherein each of said two sides of said ladder comprises a respective through-hole located in each of the fastener elements, wherein each of said two supports respectively comprises a clevis with two through-openings, wherein said removable connection comprises a pin, and wherein each of said fastener elements of said two sides is respectively provided in the clevis of each of said two supports when the ladder is in the access position; and
   wherein said storage slide comprises two side rails respectively having a C-shaped cross section arranged opposite to one another in parallel, wherein said storage slide comprises at least one end cross-member connecting said two side rails of said storage slide, and wherein each of said two side rails of said storage slide are configured to receive a respective one of the two sides of said ladder.

2. The aircraft according to claim 1, wherein said pin comprises a ball-lock system actuatable by a button.

3. The aircraft according to claim 1, wherein each of said two sides of the ladder comprises an extension inclined relative to a remainder of said two sides of said ladder, and a first of said fastener elements is positioned at a free end of one of said extensions.

4. The aircraft according to claim 1, wherein said storage slide further comprises a strap, which comprises a first end connected to a first of said two side rails of said storage slide and a second end equipped with a detachable connection that cooperates with a second of said two side rails of said storage slide.

\* \* \* \* \*